US011201787B1

(12) United States Patent
Oppenheimer et al.

(10) Patent No.: US 11,201,787 B1
(45) Date of Patent: Dec. 14, 2021

(54) ROUTING VISUALIZATION USER INTERFACE

(71) Applicant: HashiCorp, San Francisco, CA (US)

(72) Inventors: Hannah Oppenheimer, Austin, TX (US); John Cowen, San Francisco, CA (US)

(73) Assignee: HASHICORP, San Francisco, CA (US)

( * ) Notice: Subject to any disclaimer, the term of this patent is extended or adjusted under 35 U.S.C. 154(b) by 0 days.

(21) Appl. No.: 16/941,390

(22) Filed: Jul. 28, 2020

(51) Int. Cl.
*H04L 12/24* (2006.01)
*H04L 12/26* (2006.01)
*H04L 29/08* (2006.01)

(52) U.S. Cl.
CPC ...... *H04L 41/0883* (2013.01); *H04L 29/0899* (2013.01); *H04L 41/0813* (2013.01); *H04L 41/0823* (2013.01); *H04L 41/12* (2013.01); *H04L 41/22* (2013.01); *H04L 43/045* (2013.01); *H04L 43/062* (2013.01)

(58) Field of Classification Search
CPC . H04L 41/08648; H04L 41/0876–0893; H04L 41/12; H04L 41/14–16; H04L 41/22; H04L 41/5041–5054; H04L 41/5058; H04L 41/5096; H04L 67/16; H04L 29/0899; H04L 41/08–0836; H04L 43/04–062; H04L 67/36
See application file for complete search history.

(56) References Cited

U.S. PATENT DOCUMENTS

| | | | |
|---|---|---|---|
| 10,637,750 B1* | 4/2020 | Bollineni | H04L 41/5025 |
| 10,917,285 B2* | 2/2021 | Rao | H04L 43/022 |
| 2008/0240119 A1* | 10/2008 | Wylie | H04L 41/22 370/400 |
| 2009/0327903 A1* | 12/2009 | Smith | H04L 43/50 715/737 |
| 2015/0081883 A1* | 3/2015 | Katz | G06K 9/6219 709/224 |
| 2018/0145885 A1* | 5/2018 | Rao | H04L 43/062 |
| 2018/0316543 A1* | 11/2018 | Hwang | H04W 12/009 |
| 2020/0280495 A1* | 9/2020 | Sarbin | H04L 41/0803 |
| 2020/0365185 A1* | 11/2020 | Vittal | G11B 27/031 |
| 2020/0366571 A1* | 11/2020 | Vittal | H04L 41/5058 |
| 2020/0366580 A1* | 11/2020 | Sinha | H04L 43/0852 |
| 2020/0366756 A1* | 11/2020 | Vittal | H04L 67/36 |
| 2020/0366758 A1* | 11/2020 | Chauhan | H04L 67/36 |

* cited by examiner

*Primary Examiner* — Brendan Y Higa
(74) *Attorney, Agent, or Firm* — Kilpatrick Townsend & Stockton LLP

(57) ABSTRACT

A configuration of a service of a cloud computing system is rendered in a user interface of an electronic display, according to a discovery chain generated by a networking tool using a service discovery function to establish the configuration. The configuration includes one or more of a router, a splitter, and/or a resolver, each having one or more configuration files that are represented as a graphical element within a graphical representation of the one or more of the router, the splitter, and/or the resolver. The configuration further includes data traffic routes between pairs of the configuration files, each being represented in the UI as a line between each pair of configuration files, where each line is rendered in the UI so as to avoid crossing over any graphical element that represents a configuration file.

20 Claims, 7 Drawing Sheets

ROUTING VISUALIZATION USER INTERFACE

TECHNICAL FIELD

The subject matter described herein relates to routing configurations of a cloud-based computing infrastructure, and more particularly to a routing visualization user interface to visualize routing configurations for efficient service discovery and configuration management.

BACKGROUND

In cloud computing, service discovery is the detection of services (applications, microservices, etc.) and supporting resources (devices, networking hardware, etc.) in a cloud computing network, and their configurations (data traffic inputs and outputs, policies, event handlers, etc.). Such services are typically configured in one or more configuration files. Service discovery can reduce configuration efforts by users, which in turn can reduce possible errors or failures of those services and the resources they use. In some cases, such as in complex cloud networks with a large number of services, service discovery can take up valuable time and other resources. The service discovery process in a cloud computing infrastructure, particularly one using multiple cloud providers, is therefore a key in systems with a large number of services that can be discovered and connected with centralized policies for seamless interoperability and execution.

Some cloud computing providers use a networking tool that provides a service-mesh control plane, service discovery, configuration, and segmentation, for connecting and securing services across any runtime platform and public or private cloud. Such a networking tool enables an enterprise to secure and observe communication between services without modifying their code. In some instances, a networking tool configures "sidecar" proxies, which are local to an associated service for communications security, and which control network traffic between service instances to establish mutual transport layer security (TLS) between services and either allow or deny communication between them based on their registered names.

Networking infrastructure in the Open System Interconnection (OSI) model is defined by seven distinct layers. Layers L4-L7 predominantly define network services. For example, L4, the "transport layer," allows direction of traffic based on data from network and transport layer protocols, such as IP address and TCP port. L7, the "application layer" nearest to an end user, provides information to a router for content switching for load balancing, among other functionality. Information from these layers allows for routing decisions based on attributes like HTTP header, uniform resource identifier, SSL session ID and HTML form data. Service discovery tools can use the information from these layers to discover networking services as well as traffic between services.

In some cases, users can use a command line interface (CLI) or an application programming interface (API) to create service configurations using an infrastructure-as-code (IaC) service, such as Terraform® by HashiCorp. Nearly infinite configurations can be created for each service, and the configuration options can be extensive for each configuration type. Thus, users can quickly become confused about how exactly they have configured their traffic routing, and most particularly L7 traffic routing.

What is needed is a system and method by which a user can easily and more efficiently view the results of a service discovery process, to give users confidence that their configurations are routing traffic in the way they intended. Such a visual representation is also needed to present a way to troubleshoot traffic routing issues without having to scan numerous or complex configuration files.

SUMMARY

This document describes systems and methods for providing a visual representation in a web-based networking tool UI of a service discovery process of cloud computing services. The service discovery process can be modeled and represented as a "discovery chain" that passes through a number of distinct stages, or configuration types, as more fully explained below. Being able to visualize the discovery chain and its routing provides users confidence that configurations are routing traffic as intended. The systems and methods can be used to troubleshoot traffic routing issues, without having to scan numerous or complex configuration files.

In one aspect, configuration of one or more services of a cloud computing system is rendered visually, modeled as a discovery chain generated by a networking tool using a service discovery function. The discovery chain includes a set of configuration types that include one or more of a router, a splitter, and/or a resolver, each having one or more configuration files that are represented as a graphical element within a graphical representation of the one or more of the router, the splitter, and/or the resolver. The configuration further includes data traffic routes between pairs of stages that represent configuration files, each of the data traffic routes being represented in the UI as a line between each pair of configuration files. Each line is rendered in the UI so as to avoid crossing over any graphical element that represents a configuration file. Accordingly, a visual representation of each service's discovery chain is provided in a UI to give users confidence that their configurations are routing traffic in the way they intended. Such a visual representation also presents an easier way to troubleshoot traffic routing issues, without having to scan numerous or complex configuration files or other text-based documents.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
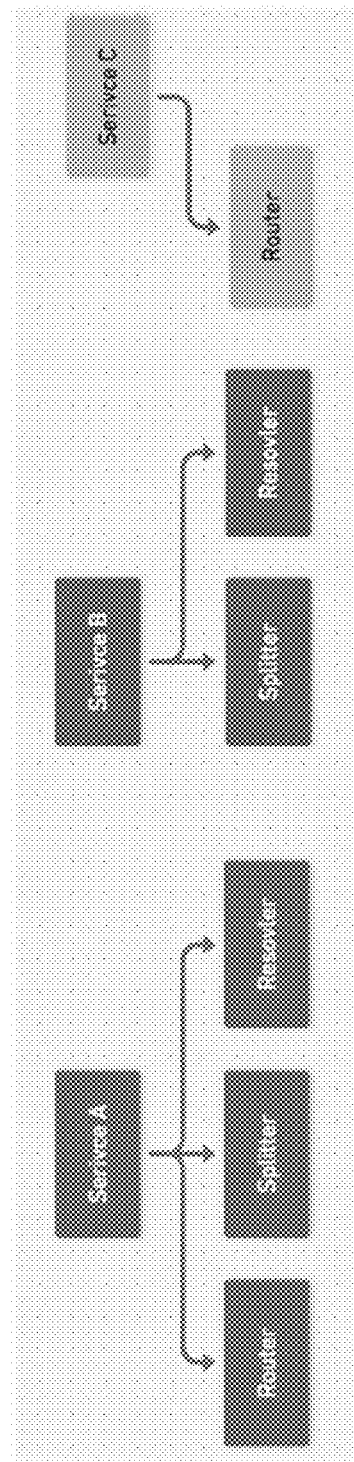
FIGS. 1A-1D are process flow diagrams illustrating various service configurations.

This document describes systems and methods for providing a visual representation of a service discovery chain of cloud computing services. The visual representation can be provided in a web-based networking tool UI. Visualization of the discovery chain and associated routing provides users confidence that configurations are routing traffic among cloud-based services as intended. The systems and methods can be used to troubleshoot traffic routing issues, without having to scan numerous or complex configuration files. Consistent with implementations described herein, "routing" in this context is the sending of data traffic between two services or endpoints of a cloud computing infrastructure. The visualization is designed to convey the configuration of how traffic should be routed between the services and/or endpoints, for example, routing can be configured to send 50% of data traffic to version A and 50% to version B of a service.

As described herein, results of a service discovery process can be modeled as a "discovery chain" which passes through three distinct stages, each representing a configuration type: routing, splitting, and resolution. Therefore, in some implementations of a service discovery model of a networking tool for use for network configuration, there are can be three configuration types or entries: Routers, Splitters, and Resolvers. Each of these has a distinct functional role. Routers are used to determine where to route to in the cloud-based computing infrastructure, based on information such as a URL path. For example, "/login" requests may go to a login service, and "/billing" requests may go to a billing service. Splitters are used to split the traffic. For instance, an enterprise may want 90% of traffic to go to a present version of a computing resource or service, and 10% to a new version of the computing resource or service, in order to test a possible migration to the new version. Resolvers are used to "map" back to the service, e.g. when a service "billing-V2" is defined, a resolver determines that a service with name "billing" and a metadata property called "version" with a value of "2" is being sought for the application traffic. Each of these stages is controlled by a set of configuration types or entries.

Traffic between any two services can be routed through any number of intermediate proxies. These software modules are responsible for forwarding traffic, but also may provide additional logic or transformation. As an example, a proxy may be used to enforce access controls. A proxy upstream is the next "hop" in the connection. For example, system A connects to proxy B, which connects to system C. In this example, system C is the "upstream" of system B. Likewise, proxy B is the "downstream" of system C.

Proxies can be deployed with applications and are responsible for handling incoming and outgoing service connections of an associated application, and are controlled centrally within the cloud computing infrastructure. This allows the services to "push" changes to the proxies that affect how they will handle incoming and outgoing traffic. By configuring different phases of the discovery chain, a user can control how proxy upstreams are ultimately resolved to specific instances of a service for load balancing. For instance, when a proxy upstream is defined, that proxy upstream becomes the service that is ultimately resolved and connected to. A downstream service connects to an upstream service. Thus, when the downstream service initiates the connection, the discovery chain can be employed to determine which upstream service to connect to. The configuration types used in the discovery chain can be designed and rendered to be simple to read and modify for narrowly tailored changes, but at discovery-time the various configuration entries interact in more complex ways.

Figure 1B:
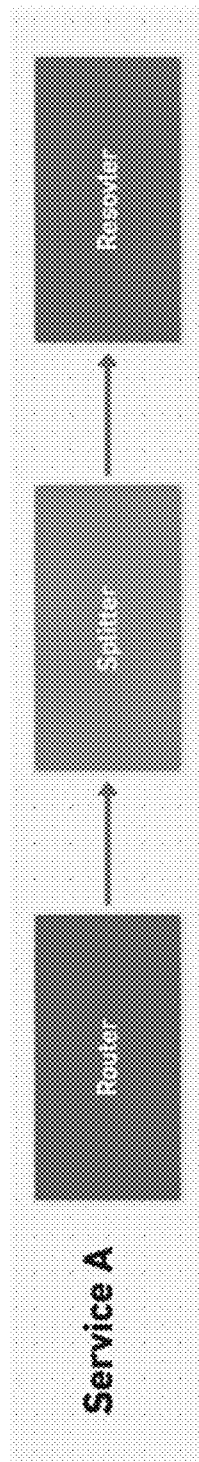
Figure 1C:
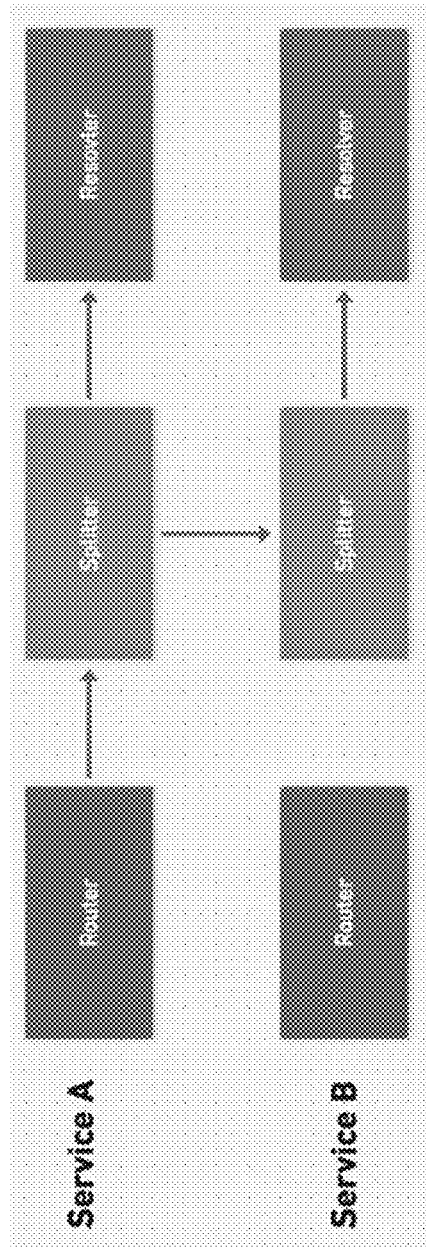
Figure 1D:
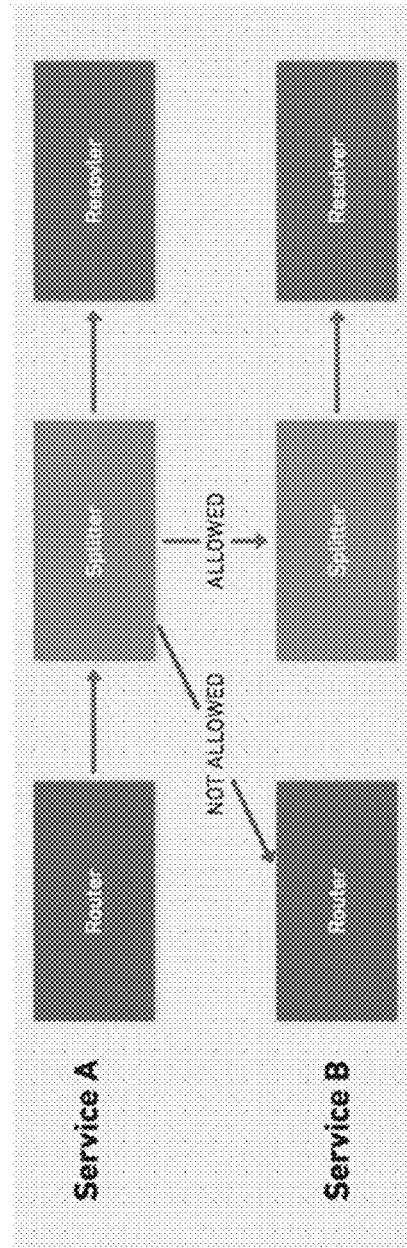

Users can set up each service to have anywhere from zero to all three configurations, as shown in FIG. 1A. However, no matter which configuration types the services are, traffic by the service will be routed in the same manner and order for each configuration: first the router (if present), then the splitter(s) (if present), then the resolver(s) (if present), as shown in FIG. 1B. In some cases these configuration types direct traffic through the configurations of another service, as shown in FIG. 1C. In most instances, traffic can only move forward or laterally in the discovery chain, not backwards, as illustrated in FIG. 1D.

Collecting information from an associated API and presenting it to a user in a useful or human-readable format is a common task in a user interface (UI) of an IaC service. Conventionally, hypertext markup language (HTML) is used to display API information due to its text rendering capabilities, accessibility and layout/stacking and reflow capabilities. But, HTML has considerable limitations, and is adequate only for displaying information in a UI using text and more or less rectangle-shaped "containers."

This biggest issue with visualization of traffic routing in a UI is being overly complicated in terms of graphical representations: e.g., lines crossing lines, lines crossing boxes, difficulty in trying to make out which lines goes where or understanding at a glance by a user how much traffic is routing to which resolver, or difficulty hovering over the lines in order to understand the proportion of traffic going to a resolver subset. While users may start out with fairly straightforward configurations being rendered in a UI, more complicated visualizations are likely, and must be addressed. While there can be no guarantee that lines do not cross other lines, for maximum usability and in accordance with implementations described herein, lines crossing boxes, i.e. edges crossing nodes, are avoided to the extent possible.

Figure 2A:
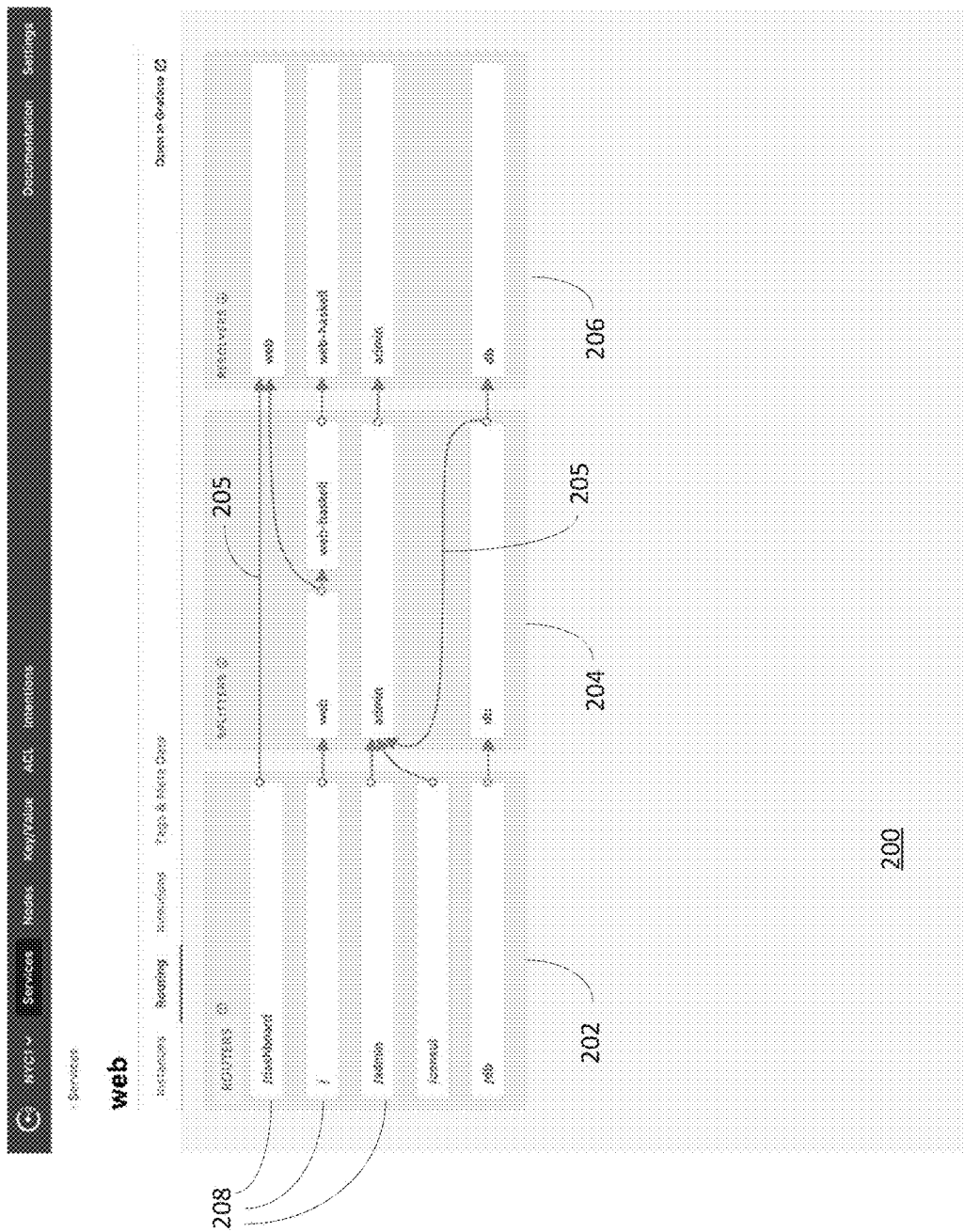
FIGS. 2A and 2B show a visual representation of traffic routing in a user interface (UI), and user interaction of the visual representation.

FIG. 2A illustrates a visual representation, or visualization 200, of a service's discovery chain of traffic routing. One or more configuration entries of each of routers 202, splitters 204 and resolvers 206 can include one or more configuration files 208, or "nodes," (e.g., the configuration files "/dashboard," "/," "/admin," "/consul," and "/db" in configuration type router 202) which are depicted as boxes within each of the routers 202, splitters 204, and/or resolvers 206 in FIG. 2A. The configuration files 208 can be rendered and depicted as any discernable shape within each representation of a configuration type 202, 204, and/or 206. In preferred implementations, routings 205 from configuration files 208 to other configuration files 208 between the routers 202, splitters 204 and resolvers 206 are depicted as curved lines with arrows, unless two configuration files 208 are rendered along the same horizontal line in the UI without having to cross an intervening configuration file 208, in which case the routings are depicted as straight horizontal lines as shown in FIG. 2A. Shapes other than arrowed lines can also be used.

The traffic routing visualization 200 can be read-only, showing the result of a service's L7 routing configuration files 208 without an ability for the traffic routing to be reconfigured or modified through the UI. In some implementations, a standardized Document Object Model (DOM) based approach can be used in order to render and display the lines and arrows on a layer underneath HTML-rendered information. This can allow using an existing tooling or framework to keep page re-rendering to a minimum when data representing the view of the discovery chain of traffic routing changes.

In such implementations, a language and format such as Scalable Vector Graphics (SVG) for the DOM can be used. SVG is an Extensible Markup Language (XML)-based vector image format using a declarative text-based format that fits in well with templating and DOM diffing capabilities, and has similar benefits to HTML. Those having skill in the art would recognize that other tools can be used. Preferably, the rendering technology is used to draw an overlay on top of the HTML rendered information containing the curved lines/arrows.

Figure 2B:
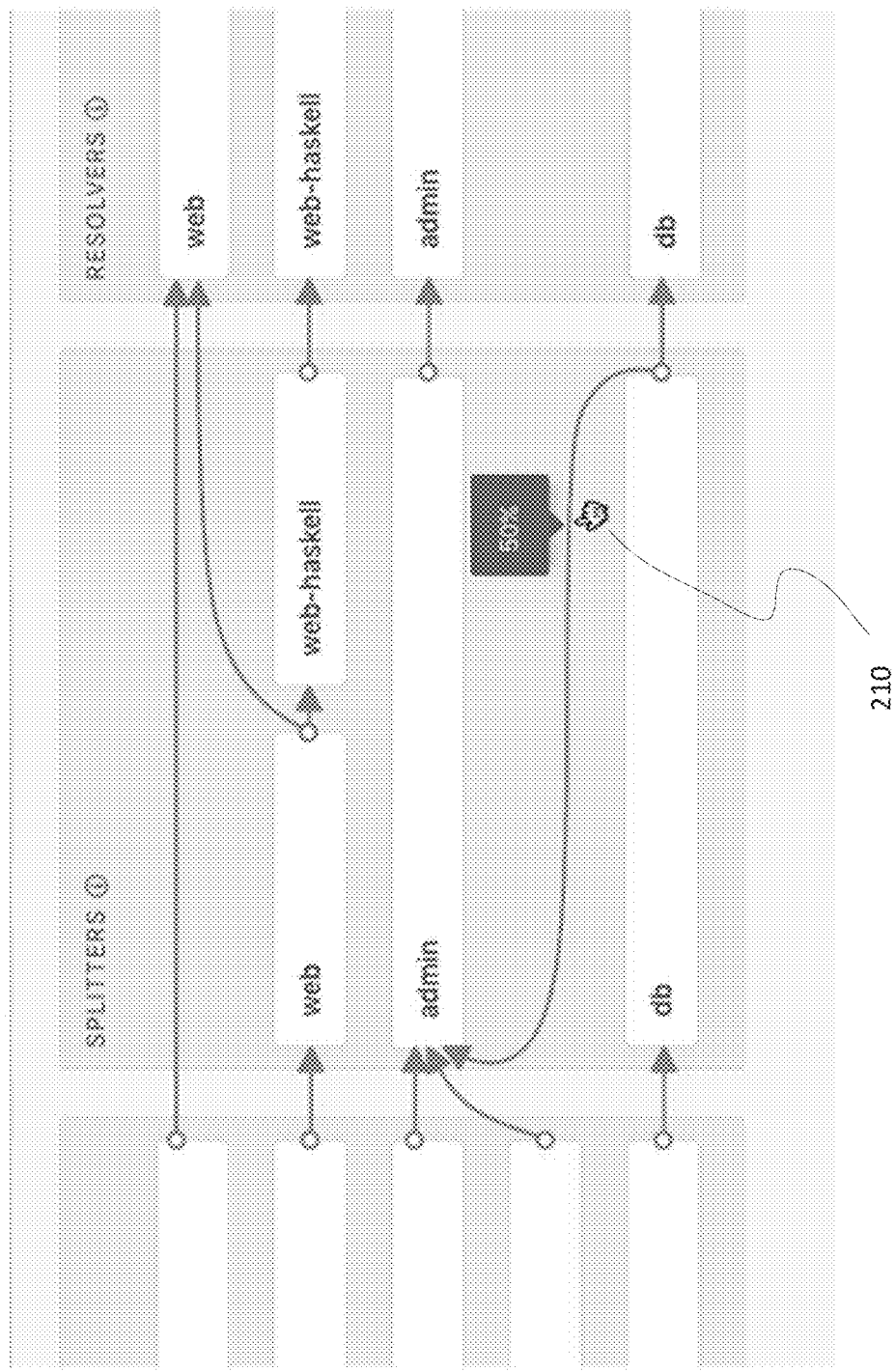

In order to calculate the path or "edge" from one node in the chain to another for the visualization, first the most straightforward calculation is used to draw a curved line from one node to another. In this first calculation, lines would be unavoidably rendered to cross each other. Further, lines will cross boxes, so initially the lines must be rendered in the UI at a lower layer to the boxes, and the boxes will be semi-transparent on top of the lines. In some cases, these issues can be mitigated somewhat by using user inputs 210 via a mouse or cursor to enable clicks/hovers on a particular graphical element to highlight a traffic flow of interest, thus making the visualization easier to follow, as shown in FIG. 2B. In other implementations, the lines representing the routings 205 can be drawn in such a way that they avoid crossing boxes.

In some implementations, for example, the UI can employ a graph traversal and path search algorithm such as A* to calculate the shortest/best path between the routes to the resolvers, while avoiding any obstacles (e.g. central column splitters) when required. This can then be rendered to SVG using a similar approach as outlined above. Those of skill in the art would recognize that any of a number of graph traversal and path generation algorithms can be used, particularly when employed to avoid crossing lines representing the paths.

Interactivity, in the form of one or more interactive functions, can be provided to the visualization 200 so that a user of the UI can interact with the visualization 200 in various ways. For example, using a graphical cursor and clicking on a box representing a configuration file 208 will isolate any related boxes and arrows that share the same pathway of routings 205. As shown in FIG. 2B, hovering the graphical cursor over a line can a split percentage or other data about the pathway of routings 205.

FIGS. 2A and 2B, described above, show the detail page for a service named "web." Thus, the "web" routers, splitters and resolvers are rendered in the visualization 200. Routes can be rendered in the order they are set, as well as any failover configurations in the resolvers, which can be rendered as a separate configuration file. In preferred implementations, users are able to edit their L7 Routing configuration files directly from the UI, via direct interactive input to the UI.

In accordance with some implementations, blocking endpoints are a set of APIs which are able to delay responding (e.g. blocking) until there is a change detected. This allows a system to push real-time updates when configurations change. Upon a definition of new blocking endpoints, the visualization 200 can be ensured to represent the latest changes of the configuration, without needing the user to refresh the page of the UI. Ideally, as updates are made to the configuration files 208, those changes would appear independently, without the visualization 200 having to be rewritten entirely from scratch because of a change.

Figure 3:
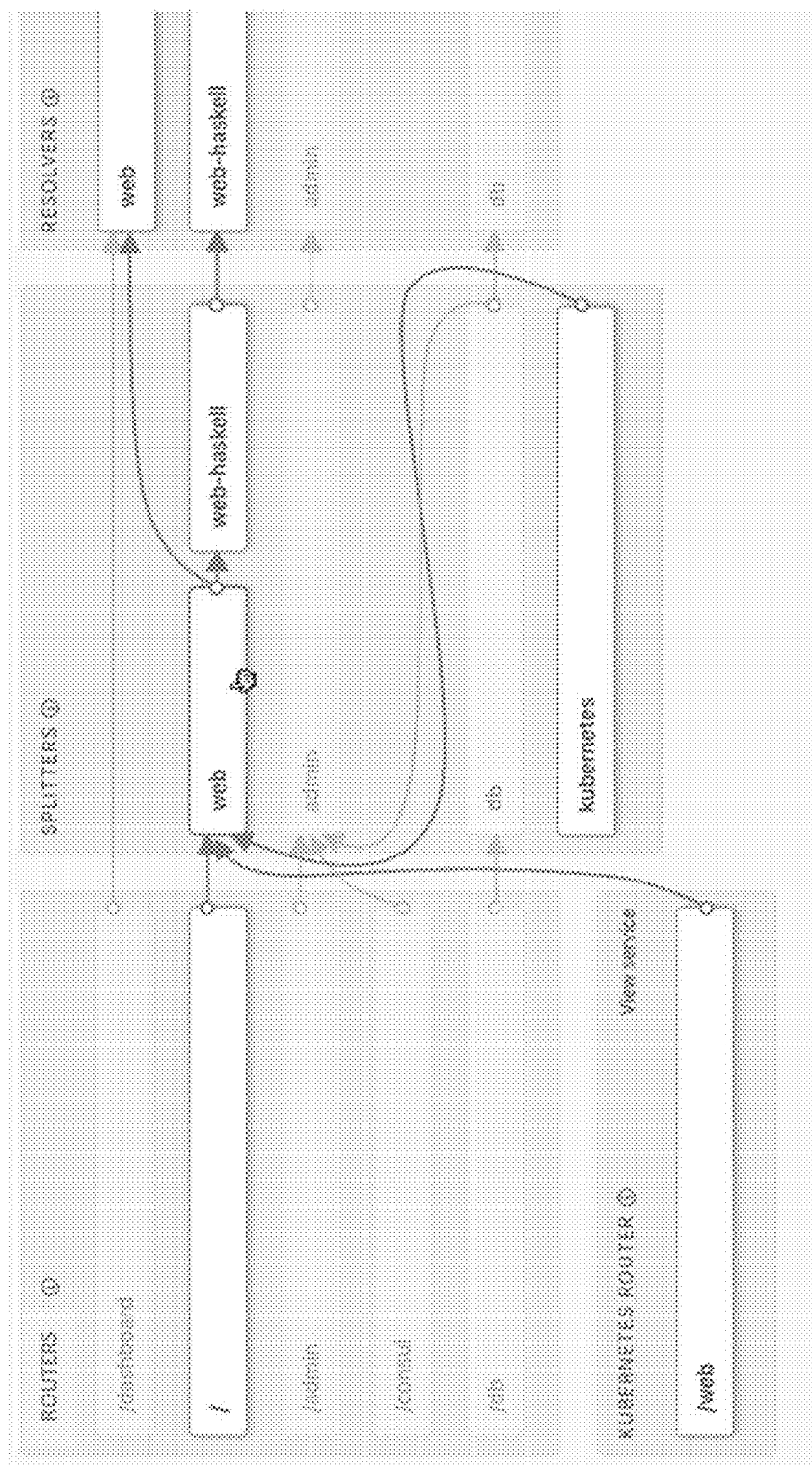
FIG. 3 illustrates routings that are prominently displayed, while other routings are faded into the background, based on a user selection of a configuration file.

Ultimately, the "route" traffic takes between two endpoints is governed by a central configuration that defines a set of rules for the routing, and which can be simple for most cases. Even in the rare case of a complex service that has many rules, those rules are likely to also be simple. For example, when the user isolates a splitter/resolver, such as by clicking on a selected configuration file 208 with a cursor, a rule can be established that some select routings are prominently displayed, while other routings are faded into the background, as illustrated in FIG. 3.

There are potentially infinite numbers of service configurations routing to a given service's splitter/resolver from outside that service. Accordingly, there is a potential for very busy visualizations in the UI. With reference to the example shown in FIGS. 2A and 2B and FIG. 3, the UI can be configured to show only portions of the routings related to that service. For example, users may be mainly interested only in "web" services, and not necessarily other services, in which case the UI can be configured to visualize only web services. As another example, to keep things easy to view in the UI, while there might be more routes in a "kubernetes" router, the system can be configured to only show route(s) most relevant to a user, i.e. based on user input. To see more or other routes, a user can click a "view service" link or similar link to go to another page for rendering in the UI that visualizes the other routes related to that service. Further, the splitter for "web" services has other services, routers and splitters directing traffic to it. While that is possibly too much information to display upon page load, it is necessary to show this traffic when the user clicks or otherwise selects that component.

Figure 4:
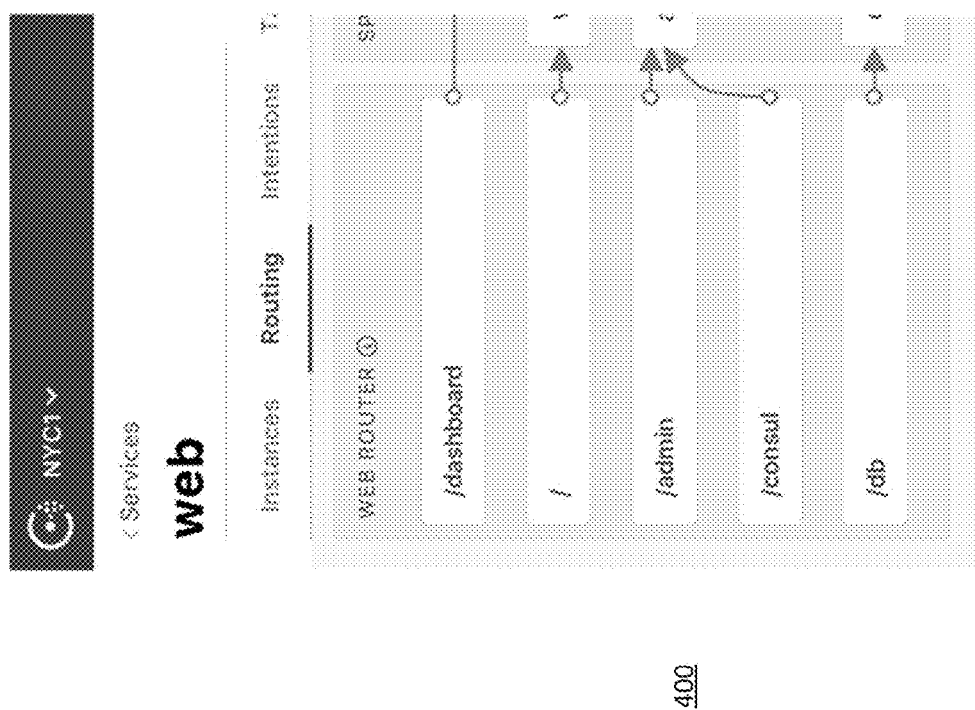
FIG. 4 shows a mobile version of a visualization, where users can "drag" horizontally to view, and zoom in/out with actions such as "pinching" the screen.

In some implementations, tools can be used that allow users to zoom in or out, or move the display horizontally or vertically. Such display tools can be similar to those used, for example, in systems such as a learning management system (LMS) like Canvas™, to enable users to use small screens to view large complex visualizations of online courses. FIG. 4 shows a mobile version of a visualization 400, where users can "drag" horizontally to view, and zoom in/out with actions such as "pinching" the screen.

Figure 5:
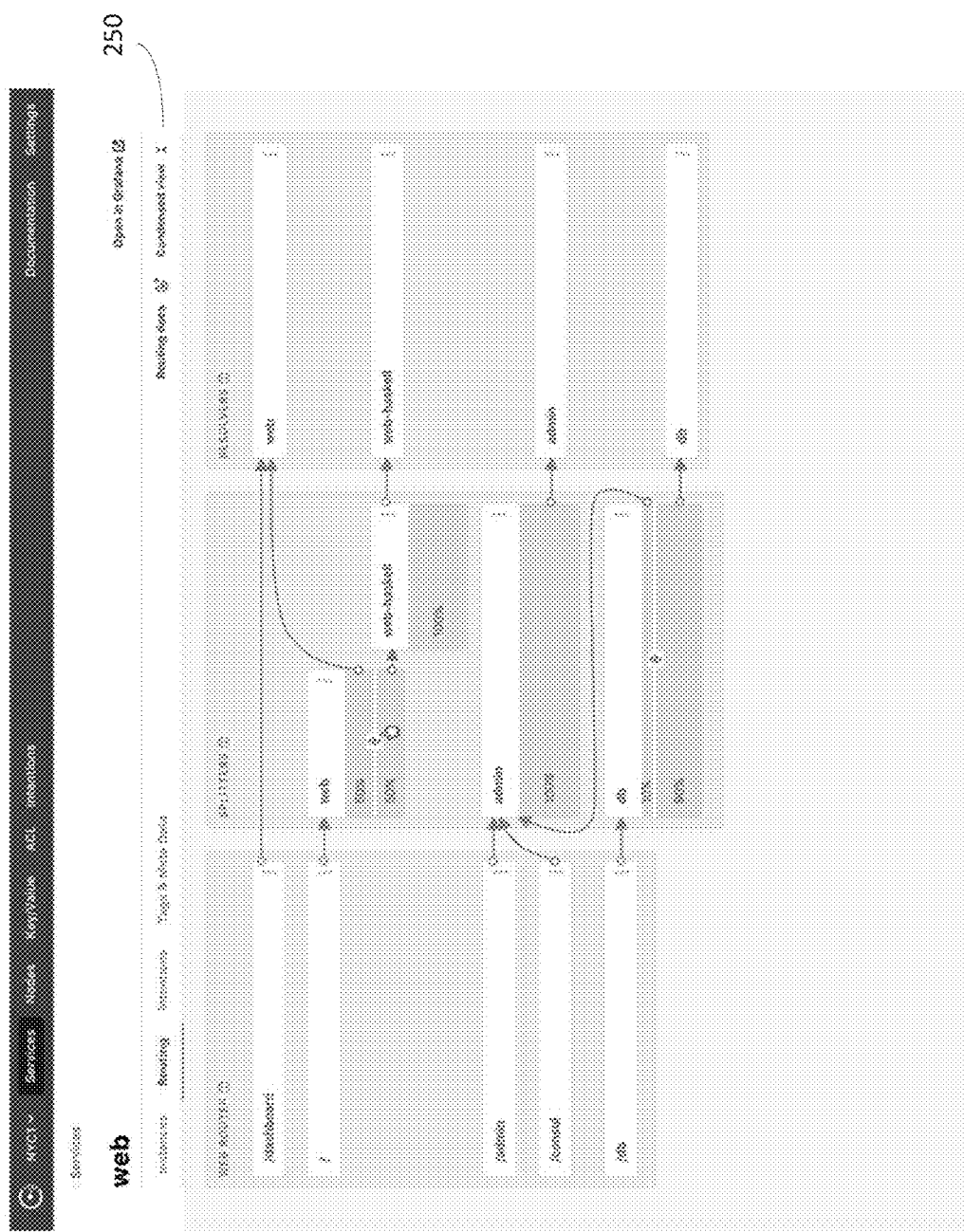
FIG. 5 illustrates a drag-able slider for a splitter to allow a user to adjust and update the split percentages easily and quickly.

FIG. 5 illustrates that splitters can have a drag-able slider to allow a user to adjust and update the split percentages easily and quickly, all the while the routings 205 are maintained. In some implementations, the ellipses can provide a dropdown menu with more actions. Arrows start from the percentage blocks, making splits more clear and visible. Additional information can be made available on the resolver boxes. A view control 250 can be provided that allows a user to select between a condensed view and an expanded view.

The visualization systems and methods described herein can provide for animation and/or Cascading Style Sheets (CSS) transitions. For example, the arrows can be animated and smoothly "draw themselves" on page load. As updates are made to the configuration files, those changes can appear independently and smoothly, without the visualization 200 having to re-write entirely from scratch just because of one small change.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
rendering, in an electronic user interface (UI), a configuration of a service of a cloud computing system, the service being rendered according to a discovery chain generated by a networking tool using a service discovery function to establish a set of configuration types, the configuration types comprising one or more of a router, a splitter, and/or a resolver, the one or more of the router, the splitter, and/or the resolver each having one or more configuration files that are represented as a graphical element within a graphical representation of the one or more of the router, the splitter, and/or the resolver, the configuration further comprising data traffic routes between pairs of the configuration files, each of the data traffic routes being represented in the UI as a line between each pair of configuration files; and
rendering, in the UI, each line so as to avoid crossing over any graphical element that represents a configuration file.

2. The computer-implemented method in accordance with claim 1, further comprising modifying the display of data related to a line or graphical element in response to the selection of the line or graphic element by a user action.

3. The computer-implemented method in accordance with claim 2, wherein modifying the display includes displaying a percentage of traffic between respective pairs of the configuration files.

4. The computer-implemented method in accordance with claim 2, wherein modifying the display includes displaying in bold a routing associated with a selected configuration file, while fading all other graphics in the UI.

5. The computer-implemented method in accordance with claim 2, wherein modifying the display includes zooming in or out on a selected portion of the UI.

6. The computer-implemented method in accordance with claim 1, wherein the graphical representation of the one or more of the router, the splitter, and/or the resolver is a squared region in the UI.

7. The computer-implemented method in accordance with claim 6, wherein the graphical element representing each configuration file is one of a box, an ellipse, a circle, a rectangle, a square, and a polyhedron within the squared region in the UI.

8. A non-transitory computer-readable storage medium storing instructions executable by one or more processors of a first device having an electronic display, to cause the one or more processors to:
render, in a two-dimensional user interface (UI) of the electronic display, a configuration of a service of a cloud computing system, the service being rendered according to a discovery chain generated by a networking tool using a service discovery function to establish a set of configuration types, the configuration types comprising one or more of a router, a splitter, and/or a resolver, the one or more of the router, the splitter, and/or the resolver each having one or more configuration files that are represented as a graphical element within a graphical representation of the one or more of the router, the splitter, and/or the resolver, the configuration further comprising data traffic routes between pairs of the configuration files, each of the data traffic routes being represented in the UI as a line between each pair of configuration files; and
render, in the UI, each line so as to avoid crossing over any graphical element that represents a configuration file.

9. The non-transitory computer-readable storage medium in accordance with claim 8, wherein the instructions further cause the one or more processors to modify the display of data related to a line or graphical element in response to the selection of the line or graphic element by a user action.

10. The non-transitory computer-readable storage medium in accordance with claim 9, wherein the instructions to modify the display include instructions to display a percentage of traffic between respective pairs of the configuration files.

11. The non-transitory computer-readable storage medium in accordance with claim 9, wherein the instructions to modify the display include instructions to display in bold a routing associated with a selected configuration file, while fading all other graphics in the UI.

12. The non-transitory computer-readable storage medium in accordance with claim 9, wherein the instructions to modify the display include instructions to zoom in or out on a selected portion of the UI.

13. The non-transitory computer-readable storage medium in accordance with claim 8, wherein the graphical representation of the one or more of the router, the splitter, and/or the resolver is a squared region in the UI.

14. The non-transitory computer-readable storage medium in accordance with claim 13, wherein the graphical element representing each configuration file is one of a box, an ellipse, a circle, a rectangle, a square, and a polyhedron within the squared region in the UI.

15. A non-transitory computer-readable storage medium including a set of instructions, wherein the instructions, when executed, cause a processor to:
render, in a two-dimensional user interface (UI) of an electronic display, a configuration of a service of a cloud computing system, the service being rendered according to a discovery chain generated by a networking tool using a service discovery function to establish a set of configuration types, the configuration types comprising one or more of a router, a splitter, and/or a resolver, the one or more of the router, the splitter, and/or the resolver each having one or more configuration files;
represent, in the UI, the one or more configuration files as a graphical element within a graphical representation of the one or more of the router, the splitter, and/or the resolver, the configuration further comprising data traffic routes between pairs of the configuration files;
represent, each of the data traffic routes in the UI as a line between each pair of configuration files; and
render, in the UI, each line so as to avoid crossing over any graphical element that represents a configuration file.

16. The non-transitory computer-readable storage medium in accordance with claim 15, wherein the instructions further cause the processor to modify the display of data related to a line or graphical element in response to the selection of the line or graphic element by a user action.

17. The non-transitory computer-readable storage medium in accordance with claim 16, wherein the instructions further cause the processor to display a percentage of traffic between respective pairs of the configuration files.

18. The non-transitory computer-readable storage medium in accordance with claim 16, wherein the instructions further cause the processor to display in bold a routing associated with a selected configuration file, while fading all other graphics in the UI.

19. The non-transitory computer-readable storage medium in accordance with claim 16, wherein the instructions further cause the processor to zoom in or out on a selected portion of the UI.

20. The non-transitory computer-readable storage medium in accordance with claim 15, wherein the instructions further cause the processor to provide interactivity to each line and graphical element in the UI, the interactivity being responsive to a user action associated with a selected line or graphical element in the UI to display additional data related to the selected curved line or graphical element.

* * * * *